United States Patent

[11] 3,624,759

| [72] | Inventor | Roger D. Carlson<br>La Grange, Ill. |
|---|---|---|
| [21] | Appl. No. | 11,991 |
| [22] | Filed | Feb. 17, 1970 |
| [45] | Patented | Nov. 30, 1971 |
| [73] | Assignee | The United States of America as represented by the United States Atomic Energy Commission |

[54] CLOSED FLUID SYSTEM PRESSURIZATION
6 Claims, 4 Drawing Figs.

[52] U.S. Cl. .................................................. 165/107,
   137/563, 137/593, 176/50, 176/62, 176/65, 237/8
[51] Int. Cl. .................................................. F28d 15/00
[50] Field of Search .......................................... 165/107,
   110; 176/37, 61, 62, 65; 137/563, 593; 237/8;
   176/50

[56] References Cited
UNITED STATES PATENTS

| 3,162,182 | 12/1964 | Gratzmuller | 165/107 X |
| 3,059,913 | 10/1962 | Sands | 165/107 X |
| 3,114,414 | 12/1963 | Judd | 165/105 X |
| 2,770,590 | 11/1956 | Serduke | 176/63 |

Primary Examiner—Albert W. Davis, Jr.
Attorney—Roland A. Anderson

ABSTRACT: A closed fluid system is pressurized by using a fluid pump instead of a cover gas. In nuclear reactor closed fluid systems where the fluid is a liquid metal, electromagnetic pumps can be used. In addition, an electromagnetic pump which develops a high pressure gradient within the pump while maintaining the inlet and outlet pressures substantially equal can be used to separate gases from the fluid.

Inventor
Roger P. Carlson
Attorney

3,624,759

1

CLOSED FLUID SYSTEM PRESSURIZATION

CONTRACTUAL ORIGIN OF THE INVENTION

The invention described herein was made in the course of, or under, a contract with the United States Atomic Energy Commission.

BACKGROUND OF THE INVENTION

In any liquid system where heating or boiling takes place, a reserve volume must be incorporated into the system to allow for the liquid expansion. Usually a cover gas or vapor is used to maintain system operating pressure. As the liquid expands, cover gas must be added or subtract from the tank if a constant pressure is to be maintained. An alternate method is to make the gas volume very large with respect to the liquid expansion volume, thereby making the change in system pressure negligible as the liquid expands or contracts.

In liquid metal systems such as are used in nuclear reactors, expensive cover gases that are inert must be used. For example, where the liquid metal is sodium or potassium, a cover gas could be argon or helium. It may also be desired to maintain the liquid level in the closed system at a relatively constant level by changing the pressurization. If pressurization is maintained by the use of a cover gas, this will require instrumentation to detect the system level and change the pressure of the cover gas to regulate the fluid level. Also, it may be desirable to remove entrapped gases in the fluid by means of high pressure gradients without affecting the system pressurization.

It is therefore an object of the invention to provide an improved system for pressurizing a closed fluid system.

Another object of this invention is to provide means for pressurizing a closed fluid system without the use of a cover gas.

Another object of this invention is to provide improved means for maintaining the fluid level of a closed fluid system by changing the pressurization of the system.

Another object of this invention is to provide means for separation of entrapped gas in a closed fluid system.

SUMMARY OF THE INVENTION

In practicing this invention, a closed fluid system is provided in which a pump circulates the fluid between a heat source and a heat exchanger. The circulating pump acts only to move the fluid and does not pressurize the fluid in the closed system. A second pump is provided which is coupled to the closed fluid system to pressurize the fluid in the system. This second pump does not move the fluid through the system but acts only to pressurize the fluid. While the pumps may be positioned at any point in the system, it is normal to place them in the cooler parts of the fluid system.

Where the fluid system is part of a nuclear reactor, electromagnetic pumps are particularly well adapted for use, since the fluid is electrically conductive. An additional two-element electromagnetic pump may be incorporated in the pressurization leg of the system to remove gases. The two-element pump acts to pressurize the fluid within the pump with a high pressure gradient within the pump while maintaining the pressure at the inlet and outlet substantially equal. A sufficiently high pressure gradient within the two-element pump will cause separation of entrapped gases from the fluid. While any form of pump may be used for system pressurization, an electromagnetic pump is particularly well adapted to achieve the high pressure gradients necessary for separation. Displacement pumps, while capable of achieving high pressures, do not develop a pressure gradient within the pump. Centrifugal types of pumps have a great deal of turbulence within the pump which limits their usefulness, even though they can achieve high pressure gradients. Thus, where the fluid is electrically conductive such as, for example, sodium or potassium used in nuclear reactors, the electromagnetic pump can be used to achieve gas separation from the fluid.

2

BRIEF DESCRIPTION OF THE DRAWINGS

The invention is illustrated in the drawings, of which:
FIG. 3 is a schematic of a closed fluid system which provides for system pressurization and removal of gases from the fluid.

DETAILED DESCRIPTION OF THE INVENTION

Figure 1:
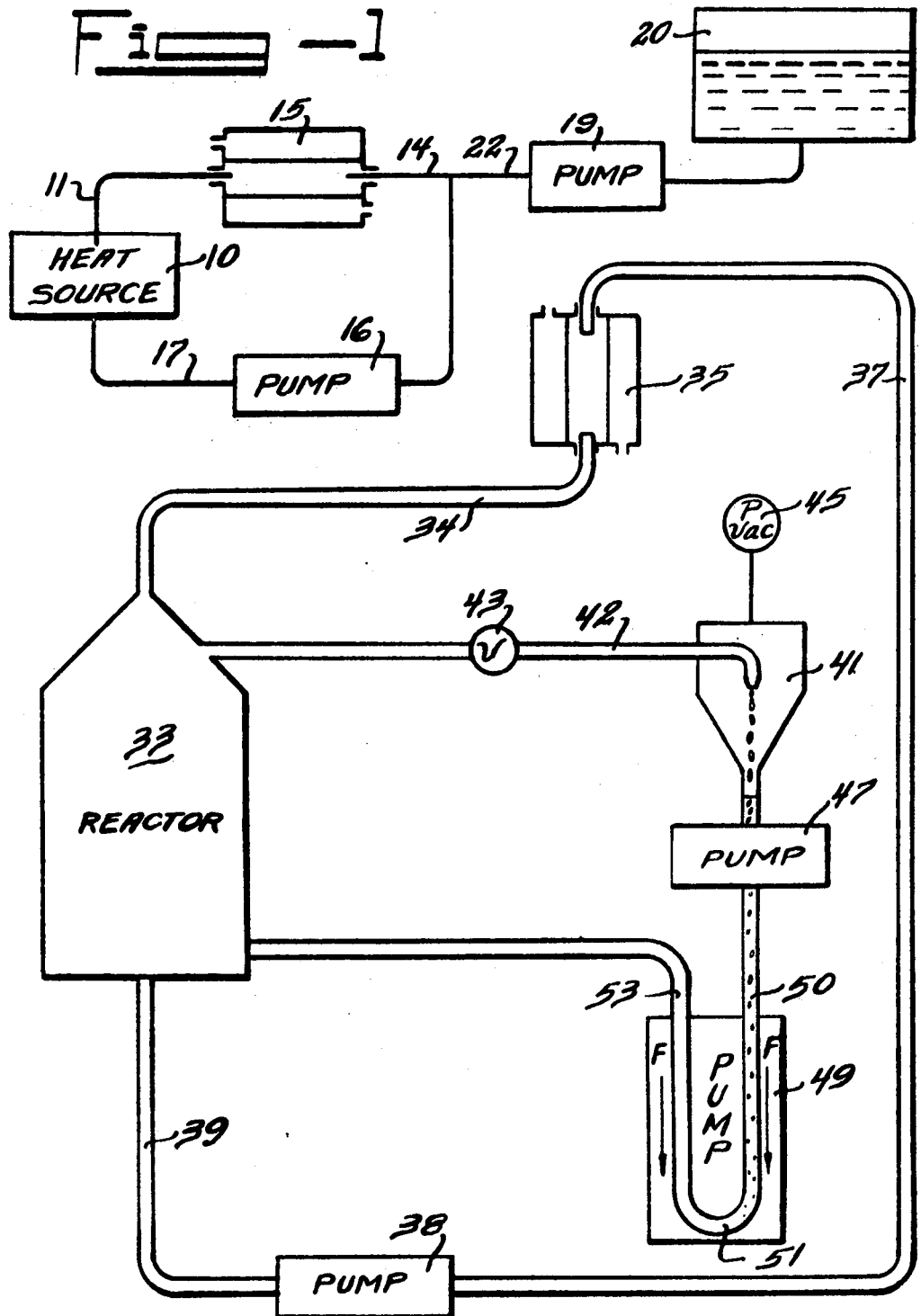
FIG. 1 is a schematic of a closed fluid system showing the method of system pressurization.

Referring to FIG. 1, there is shown a closed fluid system which provides for moving a fluid between a heat source and heat exchanger. The fluid is heated in heat source 10 and flows through pipe 11 to heat exchanger 15 where the heat is removed. The fluid then flows through pipe 14 to pump 16. Pump 16 provides the power required to move the fluid through the closed fluid system and the fluid moves from pump 16 back to heat source 10 through pipe 17.

In order to provide for system pressurization, a pump 19 and a fluid supply tank 20 are provided. The fluid supply tank is maintained under a vacuum and acts to provide a supply of fluid as required to replenish the fluid in the system. Also, as the volume of the fluid in the system changes, the fluid flows into or out of supply tank 20 to compensate for the changes in volume. Pump 19 acts to provide pressurization for the closed fluid system by pumping the fluid to a high pressure at its outlet. Since outlet 22 is connected to pipe 14 of the closed fluid system, the pressure at outlet 22 of pump 19 is propagated throughout the closed system so that the entire closed system is at substantially the same pressure as the pressure at the outlet 22. Since in normal usage very little, if any, fluid will flow through pump 19, the pump need only act to provide a pressure gradient within the pump and would not be required to move substantially large quantities of the fluid.

Figure 2:
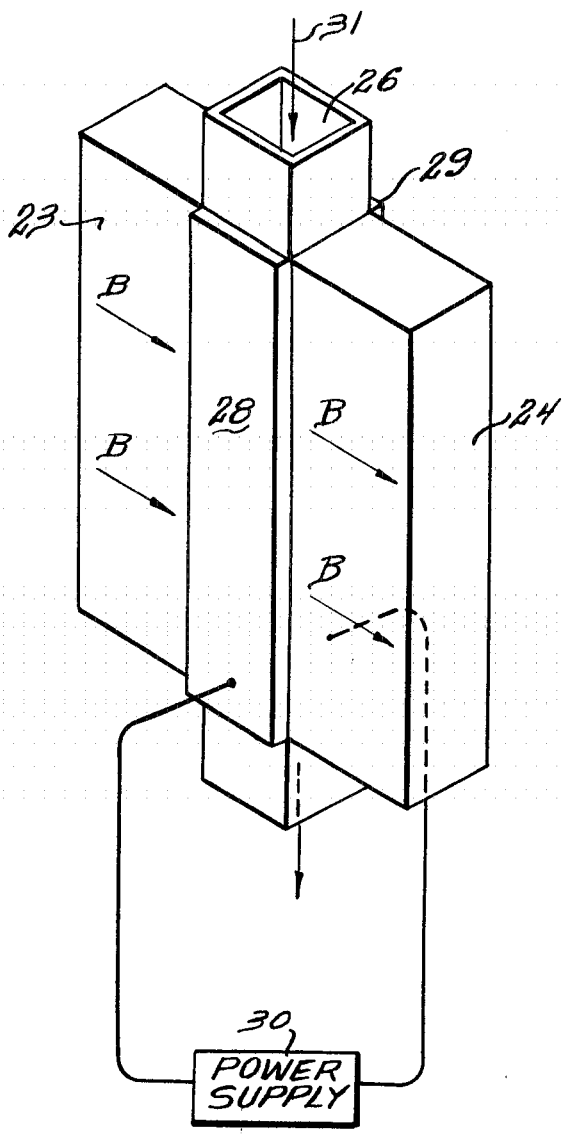
FIG. 2 is a drawing of an electromagnetic pump.

While any form of pump could be used for pump 19, where heat source 10 is a nuclear reactor and the fluid is a liquid metal such as sodium or potassium, an electromagnetic pump is particularly useful. An electromagnetic pump is shown in FIG. 2 in simplified form to illustrate its operating principles. Magnets 23 and 24 provide a magnetic field throughout the body of pump 26. Electrodes 28 and 29 are connected to a power supply 30 to provide a current flow through the fluid in pump 26. The current flowing through the fluid in pump 26 will exert a force on the fluid within the magnetic field in pump 26 will exert a force on the fluid within the magnetic field of magnets 23 and 24 to move the fluid in the direction shown by arrow 31.

Referring to FIG. 3 there is shown a nuclear reactor which uses a liquid metal as the fluid. The fluid is heated in reactor 33 and flows through pipe 34 to the heat exchanger 35. The fluid flows from heat exchanger 35 through pipe 37 to pump 38 and from pump 38 through pipe 39 back to reactor 33. This system is substantially identical to the closed fluid system of FIG. 1. In addition, a small portion of the fluid is transferred to a vacuum changer 41 through pipe 42 and metering valve 43. A vacuum is maintained in the vacuum tank 41 by vacuum pump 45. A system pressurization pump 47 acts to provide system pressurization in the manner of pump 19 of FIG. 1. In addition, the liquid flows through a two-element pump 49. Two-element pump 49 may consist of a pair of electromagnetic pumps or it may be a single electromagnetic pump with the internal conduit arranged to provide the required pressure chambers. The pressure at inlet 50 to the two-element pump 49 is the system pressure. The first element of the pump acts to increase the pressure of the fluid to a very high value at the midpoint 51 of the pump. The pressure gradient within the first element of pump 49 acts to separate gases which may be in the fluid. These gases rise to the vacuum tank 41 and are removed by vacuum pump 45. The important feature of this method of removing gases is the ability of pump 49 to provide a large pressure gradient within the pump, since it is the pressure gradient which causes the separation of the gases from the fluid.

The pressure at point 51 of the pump is far too high for use in the closed system. Accordingly, the second element of the pump acts to increase the pressure from the outlet 53 to the midpoint 51 so that the pressure at outlet 53 is substantially equal to the pressure at inlet 50. By this means, the gas removal pump 49 does not effect system pressurization but permits system pressurization pump 47 to control the system pressurization.

Figure 4:
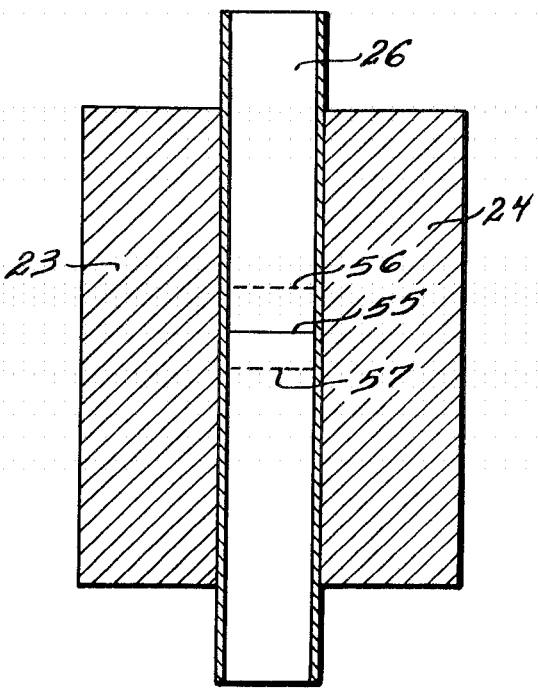
FIG. 4 is a cross-sectional view of the pump of FIG. 2.

Referring to FIG. 4, there is shown a cross-sectional view of the interior of an electromagnetic pump such as is shown in FIG. 2. In normal operation with the pump of FIG. 4 acting as a system pressurization pump, the fluid within the pump may be maintained at a level 55. If the fluid rises to a level 56, the volume of the fluid within the pump increases so that the system pressure increases. This increases in system pressure acts to force the fluid level back toward level 55. Also, if the level drops to level 57, the system pressurization will be lowered, thus permitting the liquid level to rise to a level close to liquid level 55. By this means, the liquid level in the system can be substantially self-regulating.

Thus, a simple method of pressurizing a closed fluid system has been shown. The system does not require the use of a cover gas which may be extremely expensive in nuclear reactors where liquid metals are used as the fluid. Where liquid metals are used, electromagnetic pumps can be used to achieve system pressurization. In addition, the electromagnetic pumps can be used to self-regulate the liquid level in the system and to remove gasses from the fluid.

The embodiments of the invention in which an exclusive property or privilege is claimed are defined as follows:

1. A system for pressurizing an electrically conductive fluid in a closed fluid system, including in combination, means for circulating said electrically conductive fluid through said closed fluid system, a fluid supply tank containing said electrically conductive fluid, means connecting said fluid supply tank to said closed fluid system for providing electrically conductive fluid thereto and including a first electromagnetic fluid pump, said first electromagnetic fluid pump acting to exert a force on said electrically conductive fluid supplied to said closed fluid system from said tank to pressurize said closed fluid system.

2. The system of claim 1 wherein, said closed fluid system includes a heat source, a heat exchanger having an inlet coupled to said heat source and an outlet, said means for circulating said electrically conductive fluid including a second electromagnetic pump coupling said heat exchanger outlet to said heat source for movement of said electrically conductive fluid through said closed fluid system from said heat source to said heat exchanger and return to said heat source, said first electromagnetic pump being coupled to said fluid supply tank and to a point between said heat exchanger outlet and said second electromagnetic pump.

3. The system of claim 2 further including, a third electromagnetic pump having first and second sections, said first section having an inlet connected to said first electromagnetic pump and an outlet, said second section having an inlet connected to said outlet of said first section and an outlet connected to said point between said heat exchanger outlet and said second electromagnetic pump, said first pump section acting to increase the pressure of said electrically conductive fluid from said first section inlet to said first section outlet to a predetermined magnitude, said second pump section acting to increase the pressure of said electrically conductive fluid from said second section outlet to said second section inlet to said predetermined magnitude whereby the pressure of said electrically conductive fluid at said second section outlet is substantially the same as the pressure of said electrically conductive fluid at said first section inlet.

4. The system of claim 3 wherein, said electrically conductive heat source is a nuclear reactor and said fluid is a liquid metal.

5. The system of claim 4 wherein, said electrically conductive fluid is liquid sodium.

6. The system of claim 2 wherein, said first electromagnetic pumping means is in the form of a tube positioned in a magnetic field, means coupled said tube for establishing a current flow through said electrically conductive fluid orthogonal to the direction of said magnetic field through said fluid, the level of said electrically conductive fluid in said tube at the normal operating conditions of said closed system being at a predetermined point less than the total length of said tube, a change in the electrically conductive fluid volume of said closed system acting to move said electrically conductive fluid level from said predetermined point, whereby the system pressurization is changed to restore said electrically conductive fluid level to said predetermined point.

* * * * *